(12) United States Patent
Yoneyama

(10) Patent No.: US 6,781,755 B2
(45) Date of Patent: *Aug. 24, 2004

(54) VIEWING OPTICAL SYSTEM WITH AN IMAGE-BLUR CORRECTING OPTICAL SYSTEM

(75) Inventor: Shuji Yoneyama, Saitama (JP)

(73) Assignee: PENTAX Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 10/222,864

(22) Filed: Aug. 19, 2002

(65) Prior Publication Data

US 2003/0048534 A1 Mar. 13, 2003

(30) Foreign Application Priority Data

Aug. 21, 2001 (JP) .......................... 2001-250386

(51) Int. Cl.⁷ ............................................ G02B 27/64
(52) U.S. Cl. ...................... 359/554; 359/557; 359/431; 359/676
(58) Field of Search .................. 354/554, 557, 354/431, 676

(56) References Cited

U.S. PATENT DOCUMENTS

| | | | |
|---|---|---|---|
| 5,917,653 A | 6/1999 | Taniguchi | 359/557 |
| 6,046,853 A | 4/2000 | Yano | 359/557 |
| 6,072,630 A | 6/2000 | Yano | 359/557 |
| 6,118,585 A | 9/2000 | Kanai | 359/557 |
| 6,198,575 B1 | 3/2001 | Yano | 359/557 |
| 6,226,123 B1 | 5/2001 | Kanai et al. | 359/557 |
| 6,377,399 B1 | 4/2002 | Yanari | 359/557 |
| 2002/0196543 A1 * | 12/2002 | Yano | 359/554 |

FOREIGN PATENT DOCUMENTS

| | | |
|---|---|---|
| JP | 11-7052 | 1/1999 |
| JP | 11264942 | 9/1999 |

* cited by examiner

Primary Examiner—Drew A. Dunn
Assistant Examiner—Joshua L Pritchett
(74) Attorney, Agent, or Firm—Greenblum & Bernstein, P.L.C.

(57) ABSTRACT

A viewing optical system includes an objective optical system and an eyepiece optical system. The objective optical system includes a positive first meniscus lens element having the convex surface facing toward the object, a positive second meniscus lens element having the convex surface facing toward the object, a negative third lens unit constituted by two negative lens elements, and a positive fourth lens element. The fourth lens constitutes an image-blur correcting optical system movable in a direction perpendicular to the optical axis. The viewing optical system satisfies the following conditions: $0.5 < |\tan 1°/(\phi_{1\text{-}4} - \phi_{1\text{-}3})| < 5$ (mm) ... (1) $0.5 < SF_4 < 1.0$ ... (2) wherein $\phi_{1\text{-}4}$ designates the combined power from the positive first meniscus lens element to the positive fourth lens element; $\phi_{1\text{-}3}$ designates the combined power from the positive first meniscus lens element to the negative third lens unit; and $SF_4$ designates the shape factor of the positive fourth lens element defined as $SF_4 = (r_2 + r_1)/(r_2 - r_1)$; $r_1$ designates the radius of curvature of the object-side surface of the positive fourth lens element; and r2 designates the radius of curvature of the image-side surface of the positive fourth lens element.

4 Claims, 3 Drawing Sheets

ER=2.5

-1.0  1.0
SPHERICAL
ABERRATION
CHROMATIC
ABERRATION

——— d Line
········ g Line
- - - - C Line

W=2.48

-0.1  0.1
LATERAL
CHROMATIC
ABERRATION

W=2.48

——— S
- - M

-1.0  1.0
ASTIGMATISM

W=2.48

-2.0(%)2.0
DISTORTION

ER=2.5

—— d Line
······ g Line
---- C Line

-1.0  1.0
SPHERICAL
ABERRATION

CHROMATIC
ABERRATION

W=2.48

-0.1  0.1
LATERAL
CHROMATIC
ABERRATION

W=2.48

—— S
-- M

-1.0  1.0
ASTIGMATISM

W=2.48

-2.0(%)2.0
DISTORTION

ER=2.5

-1.0  1.0
SPHERICAL
ABERRATION
CHROMATIC
ABERRATION

—— d Line
······ g Line
---- C Line

W=2.48

-0.1  0.1
LATERAL
CHROMATIC
ABERRATION

W=2.48

-1.0  1.0
ASTIGMATISM

—— S
--- M

W=2.48

-2.0 (%) 2.0
DISTORTION

VIEWING OPTICAL SYSTEM WITH AN IMAGE-BLUR CORRECTING OPTICAL SYSTEM

BACKGROUND OF THE INVENTION

1. Field of the Invention

The present invention relates to a viewing optical system with an image-blur correcting optical system which can reduce the occurrence of image blur caused by hand shake.

2. Description of the Prior Art

Regarding a viewing optical system for a binocular and the like, many viewing optical systems in which an image-blur correcting optical system is moved in a direction perpendicular to the optical axis in accordance with an amount of hand shake have been proposed. For example, such viewing optical systems are disclosed in U.S. Pat. Nos. 6,226,123, 6,046,853, 6,072,630, 6,118,585, 6,198,575 and Japanese Unexamined Patent Publication No. Hei-11-264942.

The objective optical system of the above-mentioned viewing optical system with the image-blur correcting optical system is, in many cases, constituted by a two-lens-element arrangement, i.e., a positive lens element and a negative lens element. Furthermore, in the objective optical system constituted by three or more lens elements, it is often the case that an aspherical surface is utilized in the image-blur correcting optical system. The main purpose of using an aspherical surface in the image-blur correcting optical system is to reduce deterioration on aberrations caused by the driving of the image-blur correcting optical system in a direction perpendicular to the optical axis. However, if the aperture of the objective optical system is increased, the aperture of the image-blur correcting optical system also increases, so that the manufacture of a lens element with the aspherical surface becomes difficult and expensive.

SUMMARY OF THE INVENTION

The present invention provides a large-aperture viewing optical system with an image-blur correcting optical system, which achieves easy viewing therethrough, and adequately corrects aberrations without utilizing an aspherical surface.

As an aspect of the present invention, there is provided a viewing optical system including an objective optical system and an eyepiece optical system. The objective optical system includes a positive first meniscus lens element having the convex surface facing toward the object, a positive second meniscus lens element having the convex surface facing toward the object, a negative third lens unit, and a positive fourth lens element, in this order from the object. The fourth lens constitutes an image-blur correcting optical system which is movable in a direction perpendicular to the optical axis of the viewing optical system. The viewing optical system satisfies the following conditions:

$$0.5 < |\tan 1°/(\phi_{1-4} - \phi_{1-3})| < 5 (mm) \quad (1)$$

$$0.5 < SF_4 < 1.0 \quad (2)$$

wherein $\phi_{1-4}$ designates the combined power from the positive first meniscus lens element to the positive fourth lens element;

$\phi_{1-3}$ designates the combined power from the positive first meniscus lens element to the negative third lens unit; and $SF_4$ designates the shape factor of the positive fourth lens element defined as $SF_4 = (r_2 + r_1)/(r_2 - r_1)$;

$r_1$ designates the radius of curvature of the object-side surface of the positive fourth lens element; and $r_2$ designates the radius of curvature of the image-side surface of the positive fourth lens element.

The viewing optical system further satisfies the following conditions:

$$1.2 < \phi_{1-2}/\phi_{1-4} < 2.0 \quad (3)$$

$$-4.0 < \phi_3/\phi_{1-4} < -2.0 \quad (4)$$

$$0.10 < d_4 \times \phi_{1-4} < 0.17 \quad (5)$$

wherein $\phi_{1-2}$ designates the combined power of the positive first meniscus lens element and the positive second meniscus lens element;

$\phi_3$ designates the power of the negative third lens unit;

$d_4$ designates the distance along the optical axis between the positive second meniscus lens element and the negative third lens unit; and The negative third lens unit can be constituted by a single lens element or cemented lens elements.

The present disclosure relates to subject matter contained in Japanese Patent Application No. 2001-250386 (filed on Aug. 21, 2001) which is expressly incorporated herein in its entirety.

BRIEF DESCRIPTION OF THE DRAWINGS

The present invention will be discussed below in detail with reference to the accompanying drawings, in which.

DESCRIPTION OF THE PREFERRED EMBODIMENTS

Figure 1:
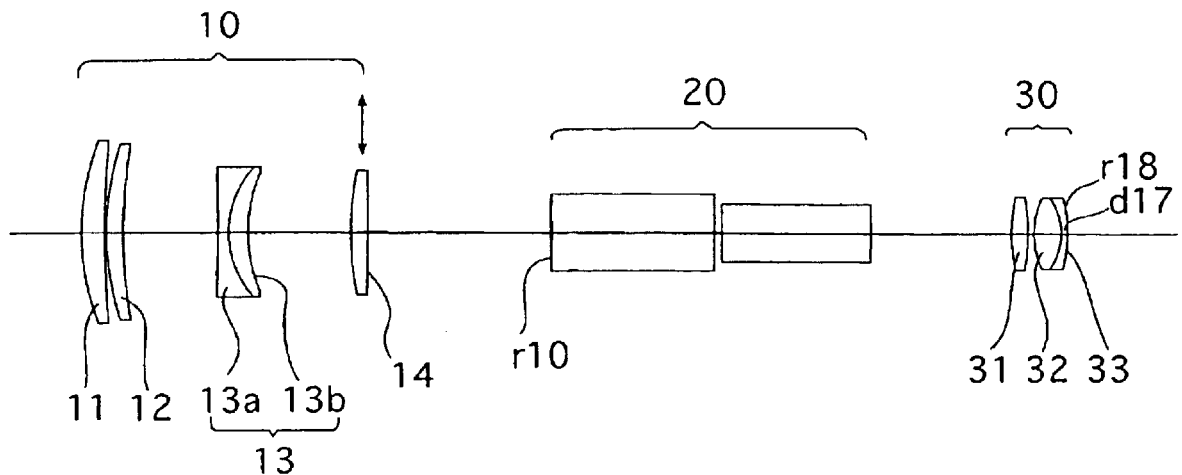
FIG. 1 shows a lens arrangement of a viewing optical system according to a first embodiment of the present invention.
Figure 2A:
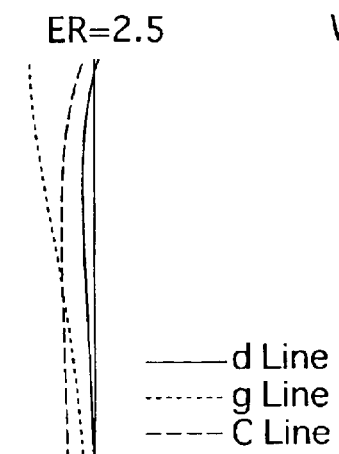
FIGS. 2A, 2B, 2C and 2D show aberrations occurred in the viewing optical system shown in FIG. 1.
Figure 2B:
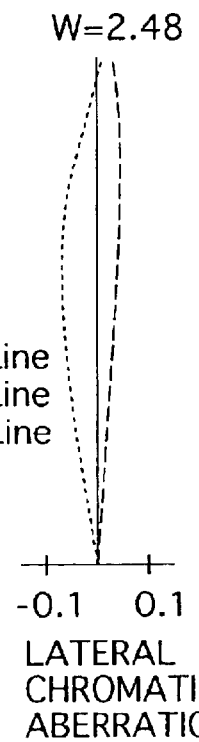
Figure 2C:
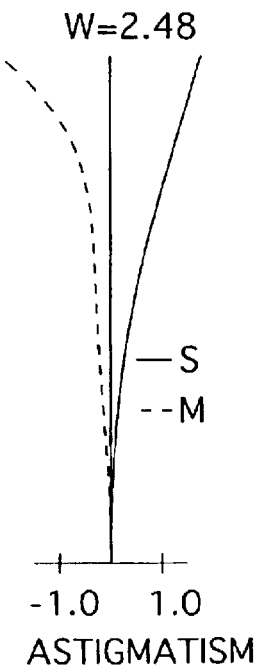
Figure 2D:
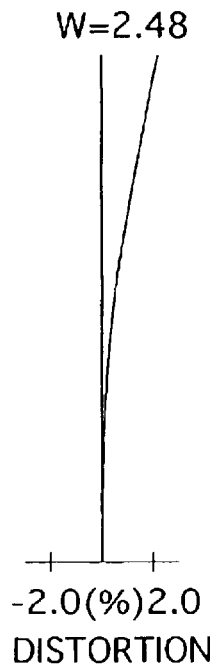

In the viewing optical system with an image-blur correcting optical system, if the aperture of the viewing optical system becomes larger, the focal length of the objective optical system increases. Accordingly, if the f-number is unchanged, the larger the aperture of the viewing optical system is, the larger aberrations become. In such an optical system for viewing, if the optical system is used for viewing on the ground, the f-number is almost unchanged, since an image-erecting optical system constituted by a prism and the like is included in the viewing optical system. Therefore the larger the aperture becomes, the larger aberrations occur.

Furthermore, in the viewing optical system with an image-blur correcting optical system, in order to reduce aberrations, particularly, coma, when the correcting of image blur is carried out, aberrations, particularly, spherical aberration, occurred in the image-blur correcting optical system, are required to be corrected independently from spherical aberration occurred in optical systems other than the image-blur correcting optical system. Moreover, in order to move the image-blur correcting optical system precisely at a high speed, the image-blur correcting optical system is required to have a low weight. Accordingly, it is desirable that the image-blur correcting optical system be constituted by one lens element. Due to the above reasons, an aspherical surface is inevitably employed. An aspherical lens surface is advantageous for the correcting of aberrations; however, the image-blur correcting optical system in the objective optical system having a large-aperture has to have a large diameter. Consequently, manufacture of a corresponding large aspherical surface becomes difficult, manufacturing costs of the lens element with the large aspherical surface are high, and the large aspherical surface is difficult to use.

In the present invention, the correcting of aberrations are carried out without using an aspherical surface. For this purpose, the objective optical system includes two meniscus lens elements each of which has the convex surface facing toward the object, a negative lens unit which is positioned away from the meniscus lens elements by a predetermined air-distance, and a positive image-blur correcting optical system constituted by a single lens element.

Furthermore, in a viewing optical system with a large angular magnification, e.g., approximately 10, it is particularly important to correct spherical aberration and coma, since the real field of view is relatively narrower. However, in the case where the power of the entire objective optical system is positive, the power of the positive lens element is stronger, so that spherical aberration in the negative direction occurs. Therefore in the objective optical system of the present invention, the two positive lens elements are provided on the object side therein to disperse spherical aberration occurred on each lens surface. As a result, occurrences of spherical aberration is reduced.

Figure 3:
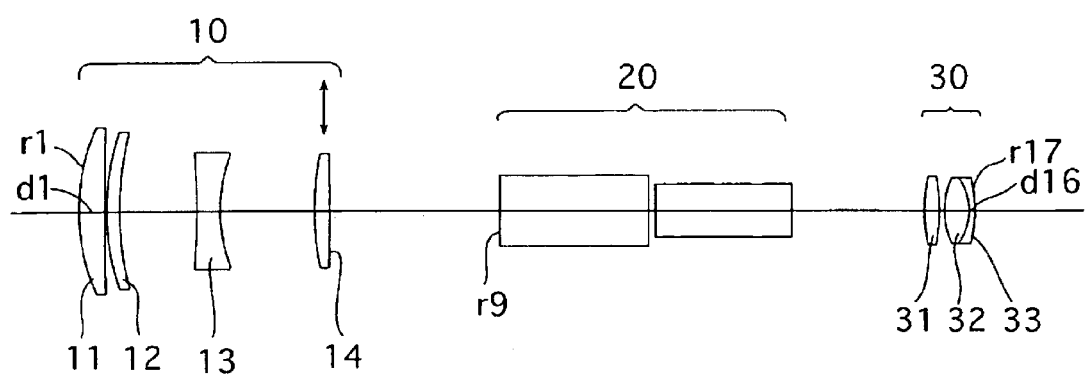
FIG. 3 shows a lens arrangement of a viewing optical system according to a second embodiment of the present invention.
Figure 4A:
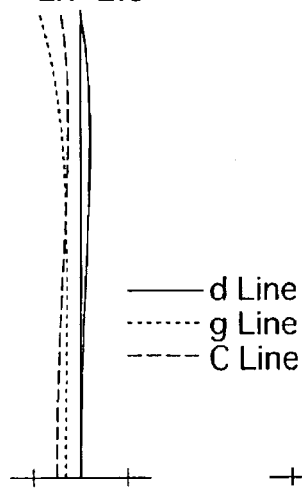
FIGS. 4A, 4B, 4C and 4D show aberrations occurred in the viewing optical system shown in FIG. 3.
Figure 4B:
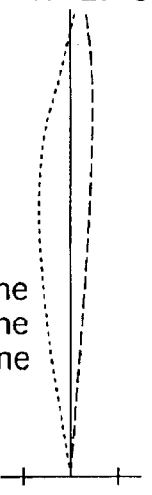
Figure 4C:
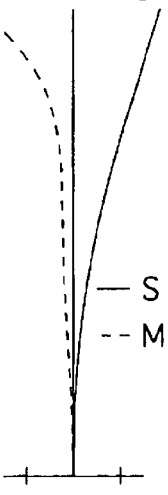
Figure 4D:
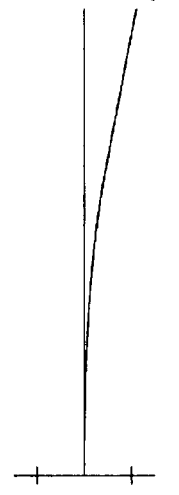
Figure 5:
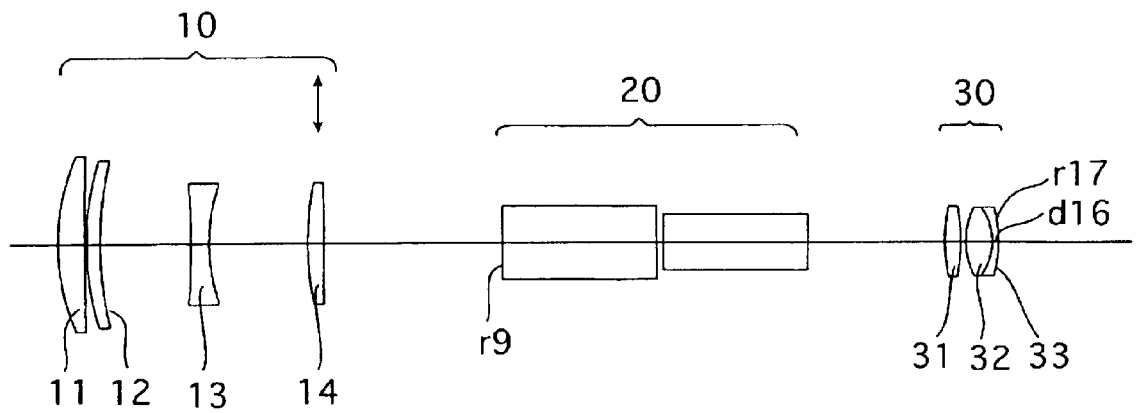
FIG. 5 shows a lens arrangement of a viewing optical system according to a third embodiment of the present invention.
Figure 6A:
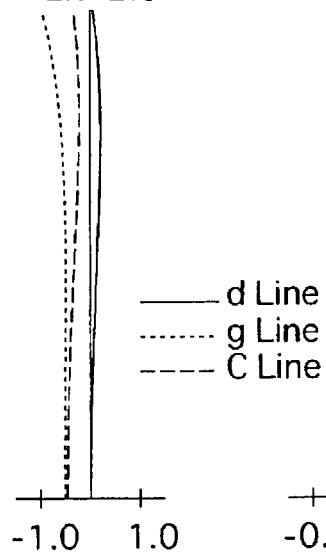
FIGS. 6A, 6B, 6C and 6D show aberrations occurred in the viewing optical system shown in FIG. 5.
Figure 6B:
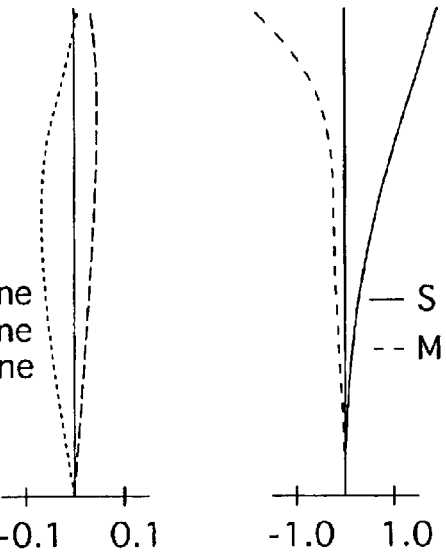
Figure 6C:
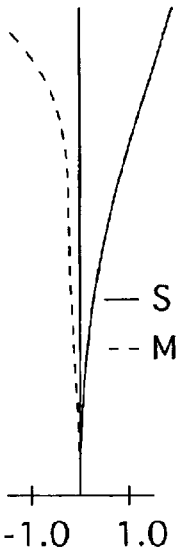
Figure 6D:
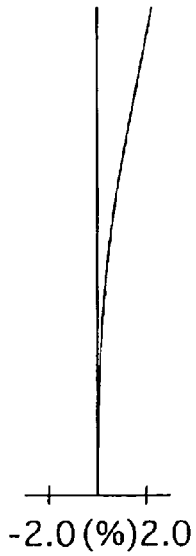

As shown in the lens arrangement of each embodiment shown in FIGS. 1, 3 and 5, the viewing optical system according to the present invention includes an objective optical system 10, an image-erecting optical system 20, and an eyepiece optical system 30, in this order from the object.

The objective optical system 10 includes a positive first meniscus lens element 11 having the convex surface facing toward the object, a positive second meniscus lens element 12 having the convex surface facing toward the object, a negative third lens unit 13, and a positive fourth lens element 14, in this order from the object.

The negative third lens unit 13 is constituted by cemented lens elements including a negative lens element 13a and a positive lens element 13b, according to the first embodiment shown in FIG. 1. Note that the combined power of the cemented lens elements is negative. On the other hand, in the second and third embodiments as shown in FIGS. 3 and 5, the negative third lens unit 13 is constituted by a negative single lens element. Likewise, each of the positive first meniscus lens element 11, the positive second meniscus lens element 12, and the positive fourth lens element 14 is constituted by a single lens element.

The fourth lens element 14 constitutes an image-blur correcting optical system which moves in a direction perpendicular to the optical axis in accordance with an amount of a hand shake imposed on the viewing-optical system. A detecting mechanism for detecting the amount of a hand shake (angular acceleration) imposed on the viewing optical system, and the driving mechanism for the driving the fourth lens 14 in a direction perpendicular to the optical axis are well known in the art, and hence, are not described herein.

Also, according to FIGS. 1, 3 and 5, the image-erecting optical system 20 is constituted by prisms; and the eyepiece optical system 30 is constituted by a biconvex positive lens element 31, a biconvex positive lens element 32, and a negative meniscus lens element 33 having the convex surface facing toward the image, in this order from the object. Here, note that the biconvex lens element 32 and the negative meniscus lens element 33 are cemented to each other.

Condition (1) specifies the sensitivity of the image-blur correcting optical system (the fourth lens 14), and determines an amount of shift (mm) of the fourth lens element 14 of the objective optical system 10 when a blur angle of 1° (a tilt of 1° due to a hand shake of a binocular which is positioned horizontally) is corrected.

If $|\tan 1°/(\phi_{1-4}-\phi_{1-3})|$ exceeds the lower limit of condition (1), the sensitivity of the image-blur correcting optical system becomes too high, so that controlling the shift of the fourth lens element 14 becomes difficult.

If $|\tan 1°/(\phi_{1-4}-\phi_{1-3})|$ exceeds the upper limit of condition (1), the sensitivity of the image-blur correcting optical system becomes too low, so that the amount of shift of the fourth lens element 14 becomes larger. Consequently, the size of an apparatus in which the viewing optical system is contained becomes larger.

Condition (2) specifies the shape of the fourth lens element 14 which constitutes the image-blur correcting optical system. By satisfying this condition, spherical aberration occurred in the fourth lens element 14 can be maintained smaller, so that coma which occurs during the correcting of image blur can also be maintained smaller. A lens shape which can minimize spherical aberration can be obtained theoretically by only considering the shape of the fourth lens element 14; however, the actual lens shape is determined according to balance between (i) the remaining aberrations occurred in lens systems, other than the image-blur correcting optical system, in the objective optical system, and (ii) aberrations, other than spherical aberration, which are occurred in the entire viewing optical system.

If $SF_4$ exceeds the lower limit of condition (2), spherical aberration in the negative direction increases, so that coma becomes larger during the correcting of image blur. Consequently, coma over the entire viewing optical system increases.

If $SF_4$ exceeds the upper limit of condition (2), spherical aberration in the positive direction increases, so that coma becomes larger during the correcting of image blur. Consequently, coma and astigmatism over the entire optical system become worse.

Condition (3) specifies the power of the two positive meniscus lens elements provided on the object side of the objective optical system.

If the power of the two positive meniscus lens elements becomes weaker to the extent that $\phi_{1-2}/\phi_{1-4}$ exceeds the lower limit of condition (3), the overall length of the viewing optical system increases.

If the power of the two positive meniscus lens elements becomes stronger to the extent that $\phi_{1-2}/\phi_{1-4}$ exceeds the upper limit of condition (3), spherical aberration in the negative direction occurs, so that the negative spherical aberration in undercorrected.

Condition (4) specifies the power of the negative third lens unit 13 which corrects both spherical aberration in the negative direction and chromatic aberration occurred in the positive first meniscus lens element and the positive second meniscus lens element. As mentioned above, the negative third lens unit 13 can be a single lens element or cemented lens elements.

If the negative power of the negative third lens unit 13 becomes weaker to the extent that $\phi_3/\phi_{1-4}$ exceeds the upper limit of condition (4), spherical aberration in the positive direction becomes smaller, so that spherical aberration is undercorrected.

If the negative power of the negative third lens unit 13 becomes stronger to the extent that $\phi_3/\phi_{1-4}$ exceeds the lower limit of condition (4), spherical aberration in the positive direction becomes too large, so that spherical aberration in the entire viewing optical system is overcorrected.

Condition (5) specifies the distance between the positive second meniscus lens 12 and the negative third lens unit 13. By positioning the positive second meniscus lens 12 and the negative third lens unit 13 with a predetermined distance therebetween so that condition (5) is satisfied, spherical aberration can be reduced, and the length of the entire viewing optical system can be made shorter.

If the distance between the positive second meniscus lens 12 and the negative third lens unit 13 becomes shorter to the extent that $d_4 \times \phi_{1-4}$ exceeds the lower limit of condition (5), the entrance height at the negative third lens unit 13 becomes higher, so that spherical aberration in the positive direction increases. Consequently, spherical aberration occurred in the entire viewing optical system is over-corrected. Furthermore, the telephoto ratio of the objective optical system cannot be made smaller, so that the length of the entire viewing optical system becomes longer.

If the distance between the positive second meniscus lens 12 and the negative third lens unit 13 becomes longer to the extent that $d_4 \times \phi_{1-4}$ exceeds the upper limit of condition (5), it is advantageous to shorten the length of the entire viewing optical system; however, the entrance height at the negative third lens unit 13 becomes too low, so that spherical aberration over the entire viewing optical system cannot be corrected.

Specific numerical examples will herein be discussed. In the tables and diagrams, ER designates the diameter of the exit pupil (half amount), W designates the incident angle (°), r designates the radius of curvature, d designates the lens thickness or space between lens surfaces, Nd designates the refractive index of the d line, and ν designates the Abbe number. In the diagrams of chromatic aberration represented by spherical aberration, the solid line and the two types of dotted lines respectively indicate spherical aberration with respect to the d, g and C lines. In the diagrams of transverse chromatic aberration, the two types of dotted lines respectively indicate magnification with respect to the g and C lines; however, the d line as the base line coincides with the ordinate. Also, in the diagrams of astigmatism, S designates the sagittal image, and M designates the meridional image.

In addition to the above, an aspherical surface which is symmetrical with respect to the optical axis is defined as follows:

$$x = cy^2/(1+[1-\{1+K\}c^2y^2]^{1/2}) + A4y^4 + A6y^6 + A8y^8 + A10y^{10} \ldots$$

wherein:

c designates a curvature of the aspherical vertex (1/r);

y designates a distance from the optical axis;

K designates the conic coefficient; and

A4 designates a fourth-order aspherical coefficient;

A6 designates a sixth-order aspherical coefficient;

A8 designates a eighth-order aspherical coefficient; and

A10 designates a tenth-order aspherical coefficient.

[Embodiment 1]

FIG. 1 shows a lens arrangement of a viewing optical system according to the first embodiment of the present invention. FIGS. 2A through 2D show aberrations occurred in the viewing optical system shown in FIG. 1. Table 1 shows the numerical data of the first embodiment.

TABLE 1

Magnification × Aperture = 10 × 50
ER = 2.5
W = 2.5°
$\phi_{1-4}$ = 1/187.459
$\phi_{1-2}$ = 1/115.307
$\phi_3$ = 1/(−64.199)
$\phi_{1-3}$ = 1/(−611.343)
$d_4$ = 25.73
$SF_4$ = 0.888
tan 1°/($\phi_{1-4}$−$\phi_{1-3}$) = 2.504
$\phi_{1-2}/\phi_{1-4}$ = 1.626
$\phi_3/\phi_{1-4}$ = −2.920
$d_4 \times \phi_{1-4}$ = 0.137

| Surface No. | r | d | Nd | ν |
|---|---|---|---|---|
| 1 | 68.243 | 6.41 | 1.51633 | 64.1 |
| 2 | 294.705 | 0.50 | — | — |
| 3 | 79.914 | 4.40 | 1.51633 | 64.1 |
| 4 | 139.868 | 25.73 | — | — |
| 5 | −574.849 | 3.00 | 1.63980 | 34.5 |
| 6 | 26.388 | 5.30 | 1.72342 | 38.0 |
| 7 | 40.836 | 28.00 | — | — |
| 8 | 82.944 | 4.60 | 1.77250 | 49.6 |
| 9 | −1395.276 | 50.00 | — | — |
| 10 | ∞ | 44.50 | 1.56883 | 56.3 |
| 11 | ∞ | 2.00 | — | — |
| 12 | ∞ | 40.50 | 1.56883 | 56.3 |
| 13 | ∞ | 38.35 | — | — |
| 14* | 39.000 | 4.50 | 1.49176 | 57.4 |
| 15 | −53.000 | 1.50 | — | — |
| 16 | 22.000 | 7.50 | 1.58913 | 61.2 |
| 17 | −16.500 | 1.70 | 1.74077 | 27.8 |
| 18 | −42.000 | — | — | — |

*designates the aspherical surface which is rotationally symmetrical with respect to the optical axis.

Aspherical surface data (the aspherical surface coefficients not indicated are zero (0.00)):

| Surface No. | K | A6 |
|---|---|---|
| 14 | −0.16000 × 10² | −0.20000 × 10⁻⁷ |

[Embodiment 2]

FIG. 3 shows a lens arrangement of a viewing optical system according to the second embodiment of the present invention. FIGS. 4A through 4D show aberrations occurred in the viewing optical system shown in FIG. 3. Table 2 shows the numerical data of the second embodiment.

TABLE 2

Magnification × Aperture = 10 × 50
ER = 2.5
W = 2.5°
$\phi_{1-4}$ = 1/187.459
$\phi_{1-2}$ = 1/104.509
$\phi_3$ = 1/(−59.425)
$\phi_{1-3}$ = 1/(−612.429)
$d_4$ = 22.86
$SF_4$ = 0.827
tan 1°/($\phi_{1-4}$−$\phi_{1-3}$) = 2.505
$\phi_{1-2}/\phi_{1-4}$ = 1.794
$\phi_3/\phi_{1-4}$ = −3.155
$d_4 \times \phi_{1-4}$ = 0.122

| Surface No. | r | d | Nd | ν |
|---|---|---|---|---|
| 1 | 61.853 | 7.81 | 1.51633 | 64.1 |
| 2 | 1794.447 | 0.50 | — | — |
| 3 | 76.020 | 3.80 | 1.51633 | 64.1 |
| 4 | 95.094 | 22.86 | — | — |

TABLE 2-continued

| | | | | |
|---|---|---|---|---|
| 5 | −226.765 | 6.87 | 1.66680 | 33.0 |
| 6 | 48.596 | 28.00 | — | — |
| 7 | 86.364 | 4.60 | 1.77250 | 49.6 |
| 8 | −910.808 | 50.21 | — | — |
| 9 | ∞ | 44.50 | 1.56883 | 56.3 |
| 10 | ∞ | 2.00 | — | — |
| 11 | ∞ | 40.50 | 1.56883 | 56.3 |
| 12 | ∞ | 39.25 | — | — |
| 13* | 39.000 | 4.50 | 1.49176 | 57.4 |
| 14 | −53.000 | 1.50 | — | — |
| 15 | 22.000 | 7.50 | 1.58913 | 61.2 |
| 16 | −16.500 | 1.70 | 1.74077 | 27.8 |
| 17 | −42.000 | — | — | — |

*designates the aspherical surface which is rotationally symmetrical with respect to the optical axis.

Aspherical surface data (the aspherical surface coefficients not indicated are zero (0.00)):

| Surface No. | K | A6 |
|---|---|---|
| 13 | $-0.16000 \times 10^2$ | $-0.20000 \times 10^{-7}$ |

[Embodiment 3]

FIG. 5 shows a lens arrangement of a viewing optical system according to the third embodiment of the present invention. FIGS. 6A through 6D show aberrations occurred in the viewing optical system shown in FIG. 5. Table 3 shows the numerical data of the third embodiment.

TABLE 3

Magnification × Aperture = 10 × 50
ER = 2.5
W = 2.5°
$\phi_{1-4}$ = 1/187.459
$\phi_{1-2}$ = 1/109.490
$\phi_3$ = 1/(−61.797)
$\phi_{1-3}$ = 1/(−610.880)
$d_4$ = 25.64
$SF_4$ = 0.804
tan 1°/($\phi_{1-4}-\phi_{1-3}$) = 2.504
$\phi_{1-2}/\phi_{1-4}$ = 1.712
$\phi_3/\phi_{1-4}$ = −3.033
$d_4 \times \phi_{1-4}$ = 0.137

| Surface No. | r | d | Nd | ν |
|---|---|---|---|---|
| 1 | 64.931 | 7.46 | 1.51633 | 64.1 |
| 2 | 1241.705 | 0.50 | — | — |
| 3 | 83.127 | 3.80 | 1.58913 | 61.2 |
| 4 | 104.505 | 25.64 | — | — |
| 5 | −236.726 | 5.18 | 1.67270 | 32.1 |
| 6 | 50.870 | 28.00 | — | — |
| 7 | 87.358 | 4.60 | 1.77250 | 49.6 |
| 8 | −803.980 | 50.20 | — | — |
| 9 | ∞ | 44.50 | 1.56883 | 56.3 |
| 10 | ∞ | 2.00 | — | — |
| 11 | ∞ | 40.50 | 1.56883 | 56.3 |
| 12 | ∞ | 39.25 | — | — |
| 13* | 39.000 | 4.50 | 1.49176 | 57.4 |
| 14 | −53.000 | 1.50 | — | — |
| 15 | 22.000 | 7.50 | 1.58913 | 61.2 |
| 16 | −16.500 | 1.70 | 1.74077 | 27.8 |
| 17 | −42.000 | — | — | — |

*designates the aspherical surface which is rotationally symmetrical with respect to the optical axis.

Aspherical surface data (the aspherical surface coefficients not indicated are zero (0.00)):

| Surface No. | K | A6 |
|---|---|---|
| 13 | $-0.16000 \times 10^2$ | $-0.20000 \times 10^{-7}$ |

The numerical values of each condition for each embodiment are shown in Table 4.

TABLE 4

| | Embodiment 1 | Embodiment 2 | Embodiment 3 |
|---|---|---|---|
| Condition (1) | 2.504 | 2.505 | 2.504 |
| Condition (2) | 0.888 | 0.827 | 0.804 |
| Condition (3) | 1.626 | 1.794 | 1.712 |
| Condition (4) | −2.920 | −3.155 | −3.033 |
| Condition (5) | 0.137 | 0.122 | 0.137 |

As can be understood from Table 4, each embodiment satisfies each condition. Furthermore, as can be understood from the aberration diagrams, aberrations are adequately corrected.

According to the above description, a large-aperture viewing optical system with an image-blur correcting optical system, which achieves easy viewing therethrough, and adequately corrects aberrations without utilizing an aspherical surface, can be obtained.

What is claimed is:

1. A viewing optical system comprises an objective optical system and an eyepiece optical system, wherein said objective optical system comprises a positive first meniscus lens element having the convex surface facing toward the object, a positive second meniscus lens element having the convex surface facing toward the object, a negative third lens unit, and a positive fourth lens element, in this order from an object;

wherein said positive fourth lens comprises an image-blur correcting optical system which is movable in a direction perpendicular to the optical axis of said viewing optical system; and wherein said viewing optical system satisfies the following conditions:

$$0.5 < |\tan 1°/(\phi_{1-4}-\phi_{1-3})| < 5 (mm)$$

$$0.5 < SF_4 < 1.0$$

wherein $\phi_{1-4}$ designates the combined power from said positive first meniscus lens element to said positive fourth lens element;

$\phi_{1-3}$ designates the combined power from said positive first meniscus lens element to said negative third lens unit; and $SF_4$ designates the shape factor of said positive fourth lens element defined as $SF_4=(r_2+r_1)/(r_2-r_1)$;

$r_1$ designates the radius of curvature of the object-side surface of said positive fourth lens element; and $r_2$ designates the radius of curvature of the image-side surface of said positive fourth lens element.

2. A viewing optical system according to claim 1, further satisfying the following conditions:

$$1.2 < \phi_{1-2}/\phi_{1-4} < 2.0$$

$$-4.0 < \phi_3/\phi_{1-4} < -2.0$$

$$0.10 < d_4 \times \phi_{1-4} < 0.17$$

wherein $\phi_{1-2}$ designates the combined power of said positive first meniscus lens element and said positive second meniscus lens element;

$\phi_3$ designates the power of said negative third lens unit; and $d_4$ designates the distance along the optical axis between said positive second meniscus lens element and said negative third lens unit.

3. A viewing optical system according to claim 1, wherein said negative third lens unit comprises a single lens element.

4. A viewing optical system according to claim 1, wherein said negative third lens unit comprises cemented lens elements.

* * * * *